UNITED STATES PATENT OFFICE.

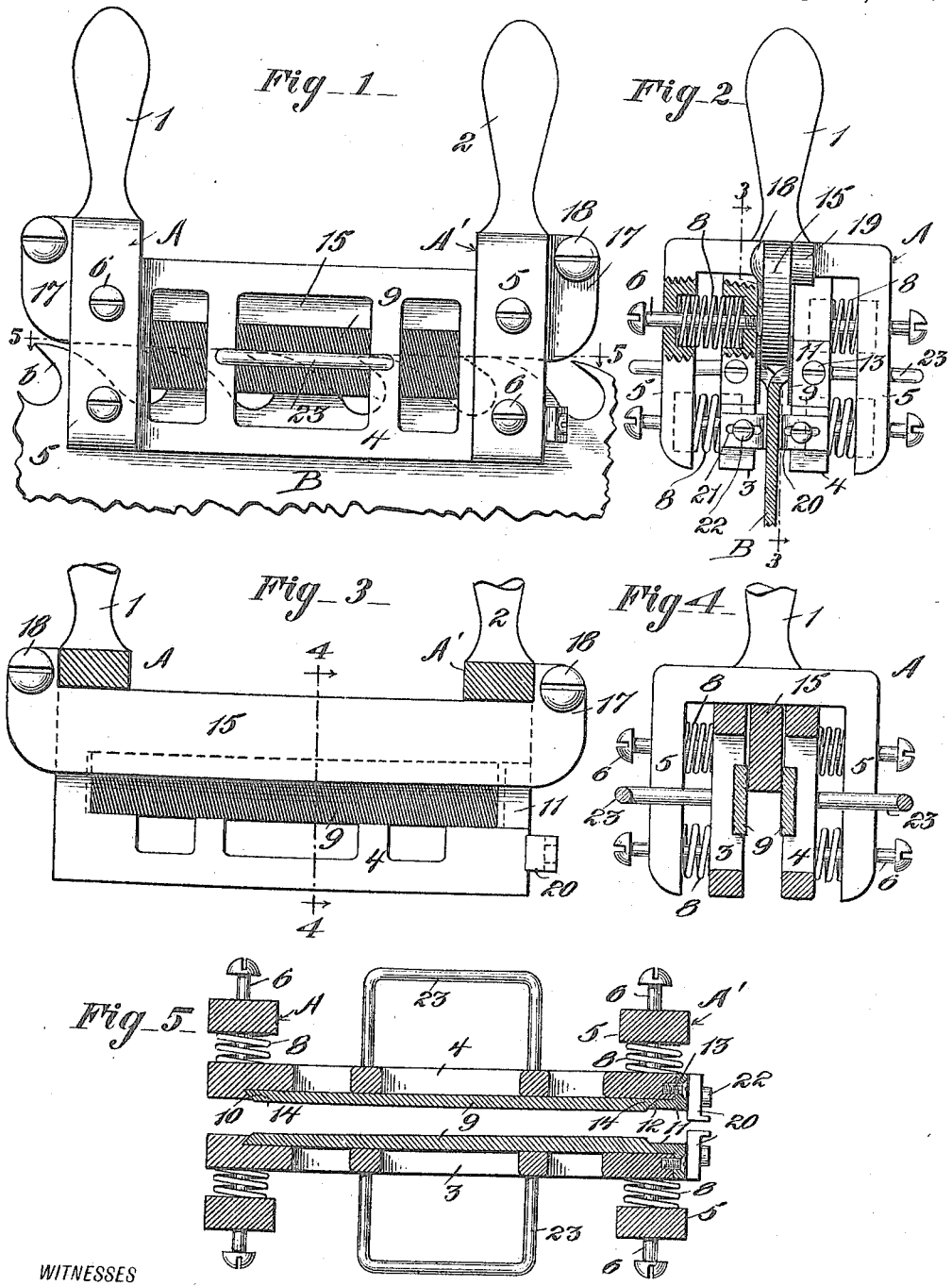

EUGENIO CHOUTEAU MANTEROLA, OF RANCAGUA, CHILE.

SAW-JOINTER.

1,136,023.

Specification of Letters Patent. Patented Apr. 20, 1915.

Application filed June 17, 1914. Serial No. 845,616.

*To all whom it may concern:*

Be it known that I, EUGENIO CHOUTEAU MANTEROLA, a citizen of the Republic of Chile, and a resident of Rancagua, Chile, South America, have invented a new and Improved Saw-Jointer, of which the following is a full, clear, and exact description.

This invention relates to a saw jointer whereby the lateral portions of the teeth of a set saw can be evened and the tooth edge of a band or other saw made of uniform thickness throughout its length.

The general objects of the present invention are to improve and simplify the construction and operation of tools of the character referred to so as to be reliable and efficient in use, comparatively inexpensive to manufacture, and so designed that the jointing or evening of the saw teeth is accomplished automatically as the tool is moved along the saw.

A further object of the invention is the provision of a saw jointer of novel construction and which embodies oppositely disposed files which are spring-pressed against opposite sides of the saw blade to file down and even the teeth after being set, there being used in combination with the spring-pressed files a guide disposed between the files so as to limit their inward movement toward each other while the guide slides on the tips of the saw teeth during the movement of the jointer on the saw.

With such objects in view, and others which will appear as the description proceeds, the invention comprises various novel features of construction and arrangement of parts, such as will be set forth with particularity in the following description and claims appended hereto.

In the accompanying drawing, which illustrates one embodiment of the invention, and wherein similar characters of reference indicate corresponding parts in all the views, Figure 1 is a side view of the jointer shown in position; Fig. 2 is an end view of the jointer; Fig. 3 is a vertical section on the line 3—3, Fig. 2; Fig. 4 is a transverse section of the jointer on the line 4—4, Fig. 3; and Fig. 5 is a horizontal section on the line 5—5, Fig. 1.

Referring to the drawing, A and A' are yokes in the form of inverted U-shaped members disposed parallel to each other and provided respectively with handles 1 and 2. These yokes straddle a pair of parallel file-carrying elements or plates 3 and 4 which are movably connected with the side members 5 of the yokes by bolts 6 which pass horizontally through the yokes and screw into openings in the file-carrying elements 3 and 4. Springs 8 encircle the bolts and are interposed between the side members of the yokes and the file-carrying elements, whereby the said elements are pressed inwardly toward each other. Each spring pressed element or plate has on its inner face, longitudinally extending files 9 which are removably mounted on the respective carrying elements by the latter each having at the forward end an undercut shoulder 10 and at its rear end an L-shaped clamp 11 which includes an undercut shoulder 12. The clamps 11 are fitted to the rear ends of the file-carrying elements and are removably fastened thereto by screws 13, so that the files can be readily taken out when worn and new ones substituted, the ends of the files being beveled at 14 so as to engage under the shoulders 10 and 12. In order to limit the inward movement of the file-carrying elements and thereby insure the proper evening or jointing of the set saw teeth, a guide in the form of a longitudinal bar 15 is arranged between the upper portions of the file-carrying elements in such a position that the bottom edge of the guide will bear on the tips of the saw teeth, and also the lower portion of the guide will be arranged in overlapping relation with the upper portions of the files 9. The ends of the guide 15 are bent upwardly into ears 17 which are removably secured by screws 18 to lugs 19 on the yokes A and A'. The guide 15 is removable, so that guides of different widths can be employed, according to the thickness of the saw blades, or according to the desired width of the tooth edge of the blade. At the lower rear corners of the file-carrying elements are adjustable gages 20, each of which has a longitudinal slot 21 through which extends a clamping screw 22 which screws into the end of the file-carrying element. These gages are adjustable according to the thickness of the saw blade, the teeth of which are being jointed, and these gages serve to maintain the file-carrying elements, together with the operative faces of the files, parallel. The file carriers 3 and 4 are each provided with grips or handles 23 located centrally thereof so as to enable the file carriers to be separated when the tool is to be placed on a saw.

In operation the tool is placed on a saw as shown in Fig. 1, and in order to so place the tool the handles 23 are grasped and pulled in opposite directions so as to separate the file carriers far enough to enable the tool to be placed downwardly in straddling relation to and on the saw B. The guide 15 rests on the set saw teeth b, and when the handles 23 are released, the file carriers are forced together to bring the files into contact with the sides of the saw teeth. The operator now grasps the handles 1 and 2 by the right and left hand, respectively, and the tool is moved slowly to the left, Fig. 1, and in so doing the files cut down and even the lateral portions of the teeth, as shown in Fig. 2, each file being long enough to engage a plurality of teeth at all times. The files dress the teeth at both sides of the saw at once, and the operation is done automatically by reason of the springs as the operator moves the tool along the saw teeth. When the files become worn they can be readily taken out and new ones substituted.

From the foregoing description taken in connection with the accompanying drawings, the advantages of the construction and method of operation will be readily understood by those skilled in the art to which the invention appertains, and while I have described the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A saw jointer comprising a pair of end yokes of U-shaped form, file carriers disposed parallel to each other and arranged between the side members of the yokes, members fastened to the carriers and extending laterally therefrom and slidable in the side members of the yokes, springs on the last-mentioned members and disposed between the yokes and carriers for pressing the latter toward each other, and a bar rigidly secured to the yokes to hold the same spaced apart in parallel relation and forming the sole connecting means between the yokes.

2. A saw jointer comprising a pair of end yokes, file carriers extending between the yokes, a pair of springs acting between each end of each carrier and the adjacent yokes for urging the carriers toward each other, a guide carried by and forming the sole connecting means between the yokes and disposed between the carriers to limit the inward movement of the latter, and adjustable devices on the carriers for engaging a saw below the teeth thereof to coöperate with the guide and govern the action of the file on the teeth.

In testimony whereof I have signed my name to this specification in the presence of two subscribing witnesses.

EUGENIO CHOUTEAU MANTEROLA.

Witnesses:
GEORGE T. SUMMERLIN,
W. J. ELLER.

Copies of this patent may be obtained for five cents each, by addressing the "Commissioner of Patents, Washington, D. C."